US009350905B2

(12) United States Patent
Hirooka et al.

(10) Patent No.: US 9,350,905 B2
(45) Date of Patent: May 24, 2016

(54) IMAGE SIGNAL PROCESSING APPARATUS, IMAGE SIGNAL PROCESSING METHOD, AND IMAGE CAPTURING APPARATUS

(71) Applicant: Hitachi Industry & Control Solutions, Ltd., Hitachi-shi, Ibaraki (JP)

(72) Inventors: Shinichiro Hirooka, Tokyo (JP); Daisuke Yoshida, Tokyo (JP); Hirotomo Sai, Tokyo (JP)

(73) Assignee: HITACHI INDUSTRY & CONTROL SOLUTIONS, LTD., Ibaraki (JP)

( * ) Notice: Subject to any disclaimer, the term of this patent is extended or adjusted under 35 U.S.C. 154(b) by 0 days.

(21) Appl. No.: 14/627,665

(22) Filed: Feb. 20, 2015

(65) Prior Publication Data

US 2015/0243002 A1    Aug. 27, 2015

(30) Foreign Application Priority Data

Feb. 21, 2014    (JP) ................. 2014-031374

(51) Int. Cl.
| | |
|---|---|
| H04N 5/202 | (2006.01) |
| G06T 5/00 | (2006.01) |
| G06T 5/40 | (2006.01) |

(52) U.S. Cl.
CPC ............ *H04N 5/202* (2013.01); *G06T 5/002* (2013.01); *G06T 5/008* (2013.01); *G06T 5/40* (2013.01); *G06T 2207/10004* (2013.01)

(58) Field of Classification Search
CPC ......... H04N 5/202; H04N 9/69; H04N 1/407; H04N 1/4072; H04N 1/4074; G06T 5/40; G06T 5/008; G06T 5/002

USPC ........................................... 348/254
See application file for complete search history.

(56) References Cited

U.S. PATENT DOCUMENTS

| | | | | |
|---|---|---|---|---|
| 8,933,975 B2* | 1/2015 | Nakanishi | ............ | G09G 3/3426 |
| | | | | 345/102 |
| 2004/0041928 A1* | 3/2004 | Hirakoso | ................. | H04N 5/20 |
| | | | | 348/254 |
| 2009/0052774 A1* | 2/2009 | Yoshii | .................... | G06T 5/009 |
| | | | | 382/167 |
| 2010/0053384 A1* | 3/2010 | Manabe | ................. | G06T 5/009 |
| | | | | 348/254 |
| 2011/0261261 A1 | 10/2011 | Mori et al. | | |

FOREIGN PATENT DOCUMENTS

JP    2010-147969 A    7/2010

* cited by examiner

*Primary Examiner* — Nelson D. Hernández Hernández
(74) *Attorney, Agent, or Firm* — Volpe and Koenig, P.C.

(57) ABSTRACT

An image signal processing apparatus includes an image signal input unit; a gradation decrease evaluation device that evaluates a decrease in gradation within a certain area in image signals; a gradation loss evaluation device that evaluates a degree of gradation loss within a certain area in image signals; an image signal correction device that performs signal level correction processing on image signals and outputs the processing result; and an image signal correction control device that controls strength of correction by the image signal correction unit, using both the gradation decrease evaluated value which is output by the gradation decrease evaluation device and the gradation loss evaluated value which is output by the gradation loss evaluation unit.

11 Claims, 16 Drawing Sheets

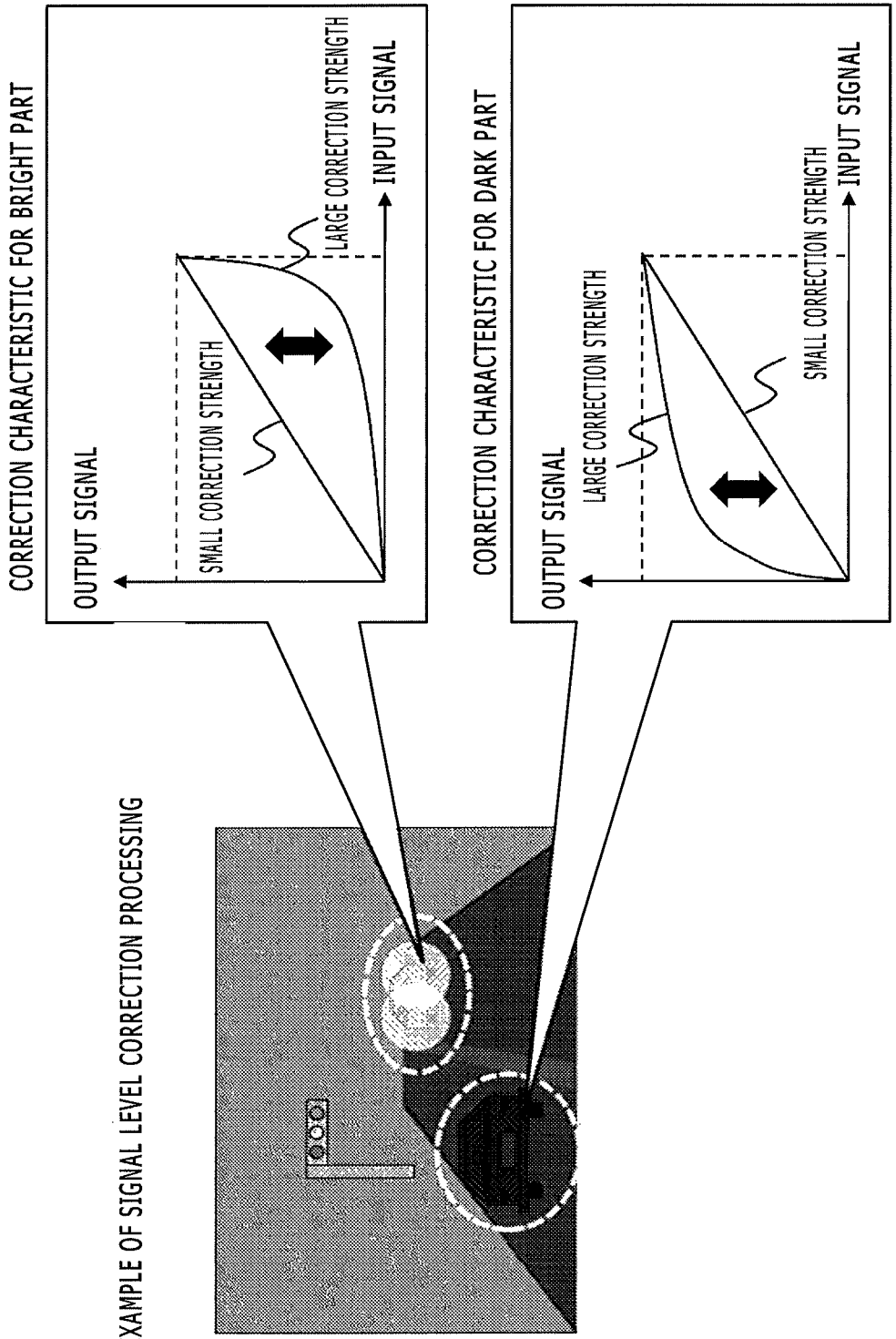

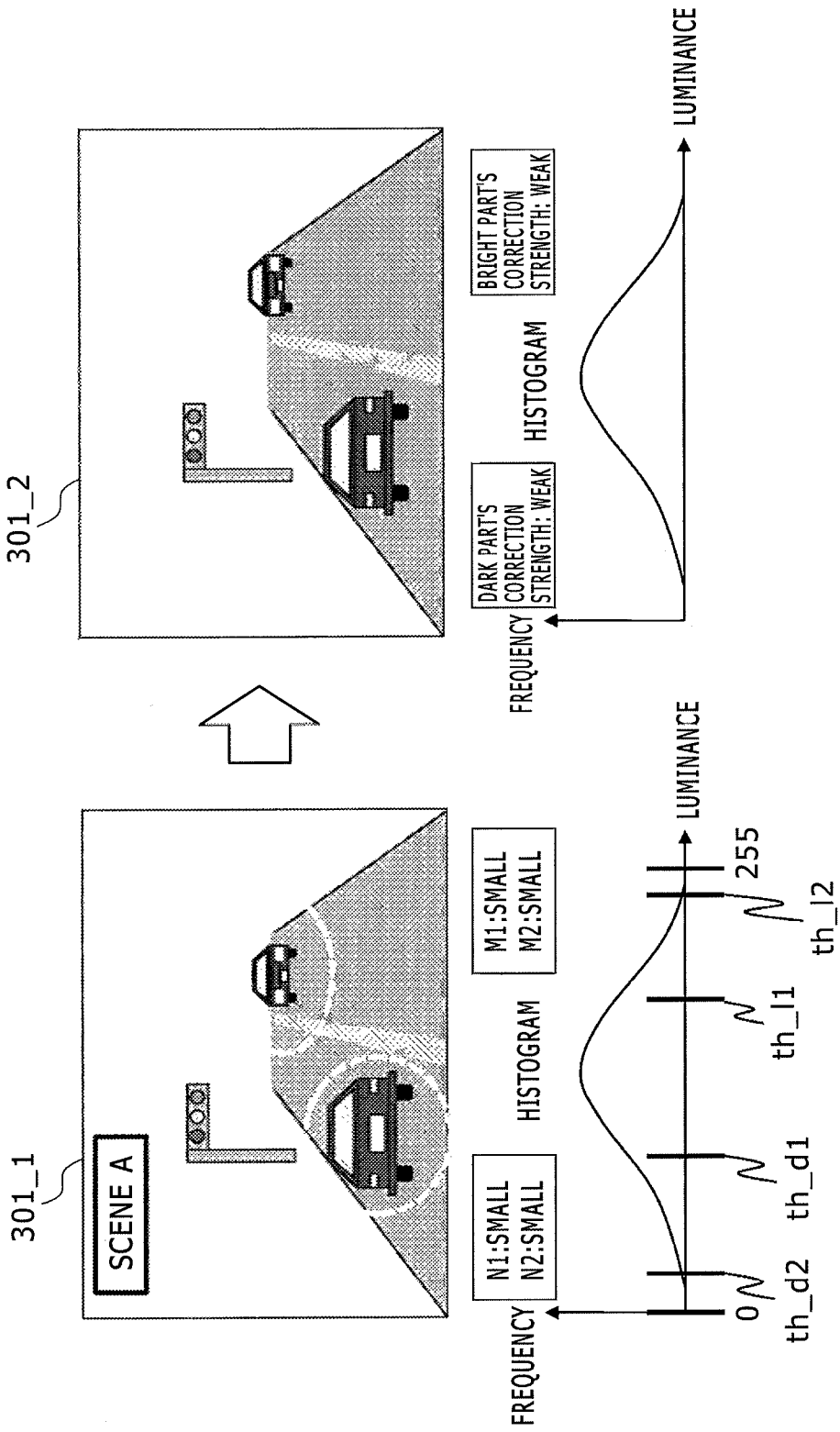

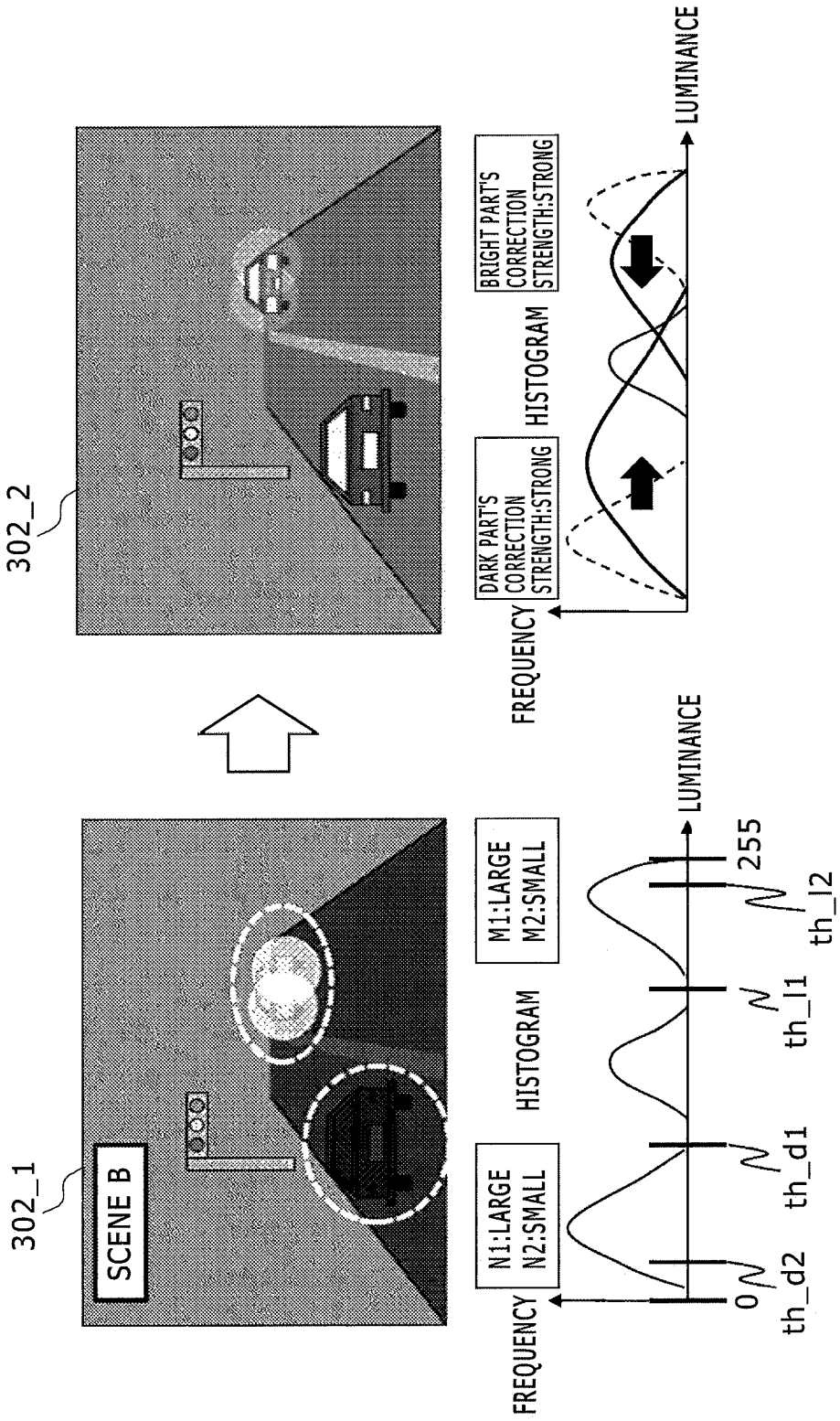

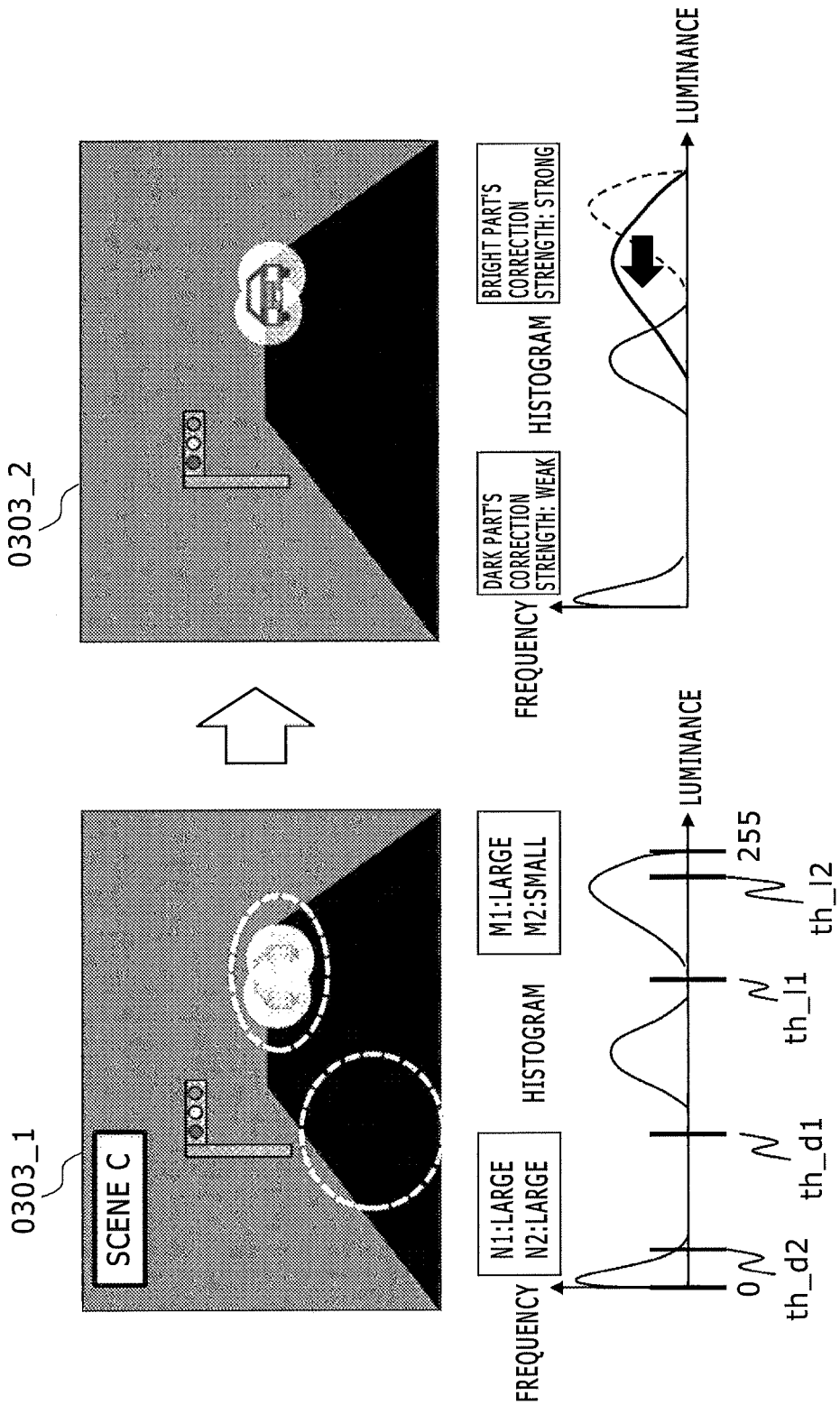

IMAGE SIGNAL PROCESSING APPARATUS, IMAGE SIGNAL PROCESSING METHOD, AND IMAGE CAPTURING APPARATUS

CROSS-REFERENCE TO RELATED APPLICATION

This application claims the Japanese Patent Application No. 2014-031374 filed Feb. 21, 2014, which is incorporated herein by reference in its entirety.

BACKGROUND

The present invention relates to an image signal processing apparatus, an image signal processing method, and an image capturing apparatus.

As background art of the present invention, there is a publication, for example, Japanese Unexamined Patent Application Publication No. 2010-147969. In the publication, the following technique is disclosed: with the aim of "providing an image correction processing circuit that can perform suitable image correction processing on an input image and generate a desired output image", the technique "includes an image correction unit 11 that performs predefined image correction processing on an input image and generates an output image; an arithmetic unit 12 that obtains a luminance histogram for each field of the input image and calculates any two values or all three values of an average luminance value, a standard deviation value, and an intermediate value of the histogram; and a correction control unit 13 that determines whether or not image correction processing on the input image is required and an amount of correction, based on any two values or all three values of an average luminance value, a standard deviation value, and an intermediate value of the luminance histogram calculated by the arithmetic unit 12, and performs control of the image correction unit 11.

SUMMARY

In the foregoing technique disclosed in Japanese Unexamined Patent Application Publication No. 2010-147969, image correction is implemented such that its strength increases in proportion to a decrease in object's gradation because of fog. Consequently, the following problems are posed: applying correction to an object image even in a scene where the object's gradation is almost lost due to a very dense fog produces a negative effect in which noise components are enhanced, even though the correction produces almost no effect of visibility enhancement; and expansion of image signals of an object lacking in gradation produces a negative effect in which a luminance level difference becomes noticeable. Similar problems also arise when large correction strength is applied to blocked up shadows in dark parts of an image or blown out highlights in bright parts.

One aspect of the present invention to solve the above problems resides in an image signal processing apparatus including an image signal input unit to which image signals are input; a gradation decrease evaluation unit that calculates a gradation decrease evaluated value for evaluating a degree of gradation decrease with respect to an object which is included in the image signals from the image signal input unit; a gradation loss evaluation unit that calculates a gradation loss evaluated value for evaluating a degree of gradation loss with respect to an object which is included in the image signals; an image signal correction unit that performs signal level correction processing on the input image signals and outputs image signals whose levels have been corrected; and an image signal correction control unit that controls correction strength of image signal correction processing that is executed by the image signal correction unit, using both the gradation decrease evaluated value which is output by the gradation decrease evaluation unit and the gradation loss evaluated value which is output by the gradation loss evaluation unit. The image signal correction control unit performs control to decrease the correction strength, if having determined that the gradation decrease evaluated value is small, and to decrease the correction strength, if having determined that the gradation loss evaluated value is large.

According to the present invention, evaluating whether or not correction is required and how much correction is effective and controlling correction strength of image correction are performed. Thereby, it is possible to prevent degradation in image quality such as noise enhancement not only under a good photographing environment not requiring correction, but also under a poor photographing environment where correction is not effective.

BRIEF DESCRIPTION OF THE DRAWINGS

FIG. 2 is a diagram representing an example of signal level correction processing pertaining to the first embodiment of the present invention;

DETAILED DESCRIPTION

In the following, embodiments of the present invention will be described with the aid of the drawings.

First Embodiment

Figure 1:
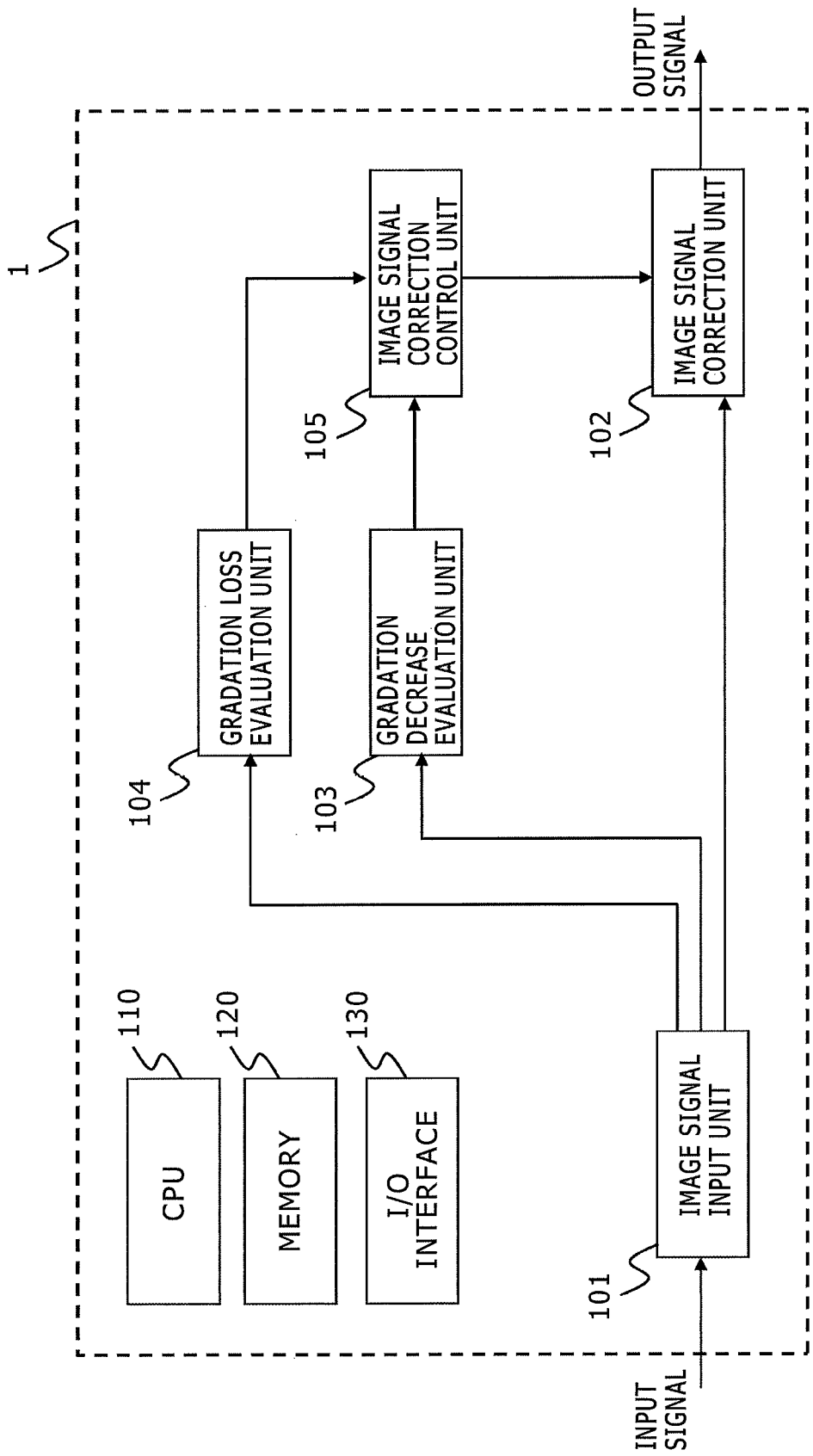
FIG. 1 is a schematic diagram depicting a configuration example of an image signal processing apparatus pertaining to a first embodiment of the present invention.

FIG. 1 is a schematic diagram depicting a configuration example of an image signal processing apparatus 1 pertaining to a first embodiment of the present invention. In FIG. 1, the image signal processing apparatus 1 includes the following processing units: an image signal input unit 101, an image signal correction unit 102, gradation decrease evaluation unit 103, a gradation loss evaluation unit 104, and an image signal correction control unit 105. Besides, the image signal processing apparatus 1 can be configured to have, e.g., a CPU (Central Processing Unit) 110, a memory 120, and an input/output interface (I/O interface) 130, as underlying hardware for the above processing units. For example, a program for implementing the respective processing units, which is stored in the memory 120, is executed by the CPU 110, and correction processing on image signals which are input through the I/O interface 130 can be performed accordingly.

In the image signal processing apparatus 1 depicted in FIG. 1, image signals are input to the image signal input unit 101 from image capturing equipment, video equipment, or an image recording medium which is connected to the apparatus via a capture board connected to a video cable or a LAN (Local Area Network) or USB (Universal Serial Bus), etc. Alternatively, the image signal input unit 101 may be provided with lenses, an image pickup device, and an A/D converter and adapted to generate image signals by performing an image capturing operation.

The image signal correction unit 102 corrects signal levels which are signal values per pixel of image signals which have been input from the image signal input unit 101, based on a predefined input-output characteristic and a correction strength parameter, and generates an output signal. Correction processing of signal levels includes gradation correction processing such as correcting a black signal due to underexposure in a backlight condition, fog or haze correction, and wide dynamic range processing. As predefined input-output characteristics, such characteristics are prepared in a form such as a lookup table or function expression so that signals are expanded in a desired brightness level according to purpose, e.g., in a dark part in the case of underexposure, in an intermediate luminance part in the case of fog or haze correction, and in both dark and bright parts in a wide dynamic range scene. By correcting signal levels based on the appropriate input-output characteristic, it is possible to expand gradation. Additionally, by correcting the above input-output characteristic by use of a correction strength parameter obtained by an image signal correction control unit 105 which will be described later, it is possible to control whether or not correction should be applied and whether to strengthen or weaken correction. It may be arranged that a plurality of lookup tables, function expressions, and correction strength parameters can be used so that correction can be made with different input-output characteristics for different areas of an image or different brightness levels of an object. For example, image signals to be input are separated into low frequency components and high frequency components in a preprocessing phase. The correction unit regards the low frequency components as brightness information, determines what level of brightness of an object including pixels of interest, and applies different signal level correction processing to an object existing in a dark part and an object existing in a bright part. In this way, it is possible to perform an optimum gradation correction for each object. Further, the correction unit may be adapted to perform signal level correction processing using different input-output characteristics for different areas in an image signal, so that it can perform optimum correction for each object in the image.

The gradation decrease evaluation unit 103 evaluates whether or not a decrease in object's gradation occurs due to a cause such as underexposure or fog and calculates it as a gradation decrease evaluated value, based on characteristic quantity such as histogram data which is obtained from image signals input from the image signal input unit 101, and outputs the evaluated value to the image signal correction control unit 105.

The gradation loss evaluation unit 104 evaluates whether or not object's gradation is completely lost, affected to a very large degree by underexposure, fog, or the like and calculates it as a gradation loss evaluated value, based on characteristic quantity such as histogram data which is obtained from image signals input from the image signal input unit 101, and outputs the evaluated, value to the image signal correction control unit 105. An example of a calculation method for the gradation decrease evaluated value and the gradation loss evaluated value will be detailed by way of FIG. 3.

The image signal correction control unit 105 obtains a gradation decrease evaluated value from the gradation decrease evaluation unit 103 and a gradation loss evaluated value from the gradation loss evaluation unit 104 respectively, determines whether or not signal level correction processing is required according to the magnitude of the gradation decrease evaluated value, and determines whether or not signal level correction processing is effective according to the magnitude of the gradation loss evaluated value. The image signal correction control unit 105 controls the correction strength parameter so that correction strength will become large if the gradation decrease evaluated value is large and the gradation loss evaluated value is small, and outputs this parameter to the image signal correction unit 102. Using this correction strength parameter, the image signal correction unit 102 performs signal level correction processing, so that correction is applied only when correction is required and correction is sufficiently effective. Accordingly, image correction is deactivated for a scene photographed in good condition at high contrast and not requiring correction and, in an opposite case, it is possible to prevent a negative effect such as noise enhancement due to overcorrection for a scene photographed in bad condition for which no effect is produced by correction.

While the description of the image signal processing apparatus 1 depicted in FIG. 1 focuses on the processing units which directly relate to the present invention, other important processing tasks such as high-quality image processing, signal format conversion, and compression/expansion may be performed before, after, or during each process.

The respective processes (processing units) constituting the image signal processing apparatus 1 depicted in FIG. 1 are implemented by applications which are run by the CPU, as illustrated, if a personal computer is used. If embedded devices are used, these processes can be implemented by a microcomputer, DSP, application-specific LSI, etc. For optimizing cost and performance, signal processing such as obtaining histogram data and signal level correction processing may be implemented by DSP and application-specific LSI, whereas control processing such as gradation decrease evaluation, gradation loss evaluation, and controlling the correction strength parameter may be implemented by a microcomputer.

FIG. 2 is a diagram representing an example of signal level correction processing pertaining to the first embodiment of the present invention. In the present embodiment, signal level correction processing is executed by the image signal correction unit 102. FIG. 2 represents an example of correction processing in a case where object's gradation has decreased due to underexposure in a backlight condition, illuminated by the headlights of an oncoming car at night.

In the example of signal level correction processing represented in FIG. 2, the image signal correction unit 102 preliminarily holds input-output characteristics to provide correction characteristics that differ for a dark part and a bright part and applies the appropriate input-output characteristic depending on whether pixels of interest exist in a dark part or a bright part. Determining whether pixels of interest exist in a dark part or a bright part can be made, for example, by calculating low frequency components of luminance signals according to an average value of luminance for a local area including the pixels of interest and performing threshold processing on the calculated low frequency components. If the pixels of interest exist in a dark part, it is possible to improve the visibility of an object appearing to be blocked up shadows by raising their signal level. If the pixels of interest exist in a bright part, it is possible to improve the visibility of an object appearing to be blown out highlights by lowering their signal level. Further, correction is made of the input-output characteristics of a dark part and of a bright part depending on the correction strength parameter. If the correction strength parameter is small, it is possible to weaken the correction by approximation to an input-output characteristic in which input and output match. In this way, adaptive gradation correction depending on the brightness of an object makes it possible to improve the visibility in an area of blocked up shadows and an area of blown out highlights. By giving the correction strength parameter as an input, it would become possible to control whether or not correction should be applied and whether to strengthen or weaken correction as necessary.

Figure 3A:
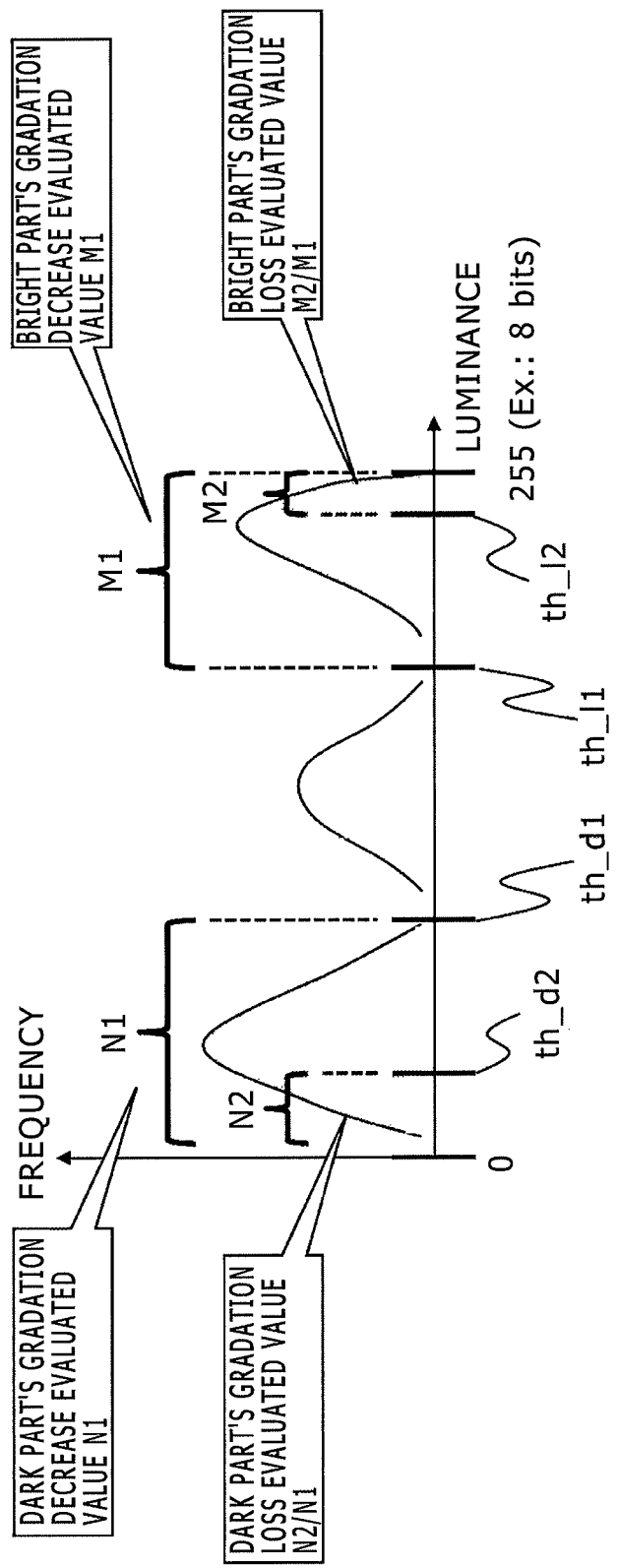
FIG. 3A is a diagram representing examples of gradation decrease evaluated values which are output by a gradation decrease evaluation unit 103 and examples of gradation loss evaluated values which are output by a gradation loss evaluation unit 104, pertaining to the first embodiment of the present invention.
Figure 3B:
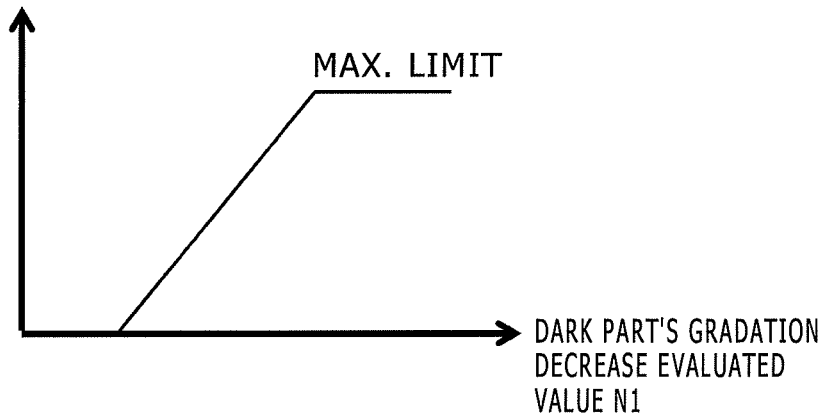
FIG. 3R is a diagram representing an example of signal level correction strength parameter control processing based on a gradation decrease evaluated value, pertaining to the first embodiment of the present invention.
FIG. 3C is a diagram representing an example of signal level correction strength parameter control processing based on a gradation loss evaluated value, pertaining to the first embodiment of the present invention.
FIG. 3D is a diagram representing an example of a characteristic of final signal level correction strength parameter control, pertaining to the first embodiment of the present invention.
FIG. 3E is a first diagram representing an example of a result of final signal level correction strength parameter control, pertaining to the first embodiment of the present invention.
FIG. 3F is a second diagram representing an example of a result of final signal level correction strength parameter control, pertaining to the first embodiment of the present invention.
FIG. 3G is a third diagram representing an example of a result of final signal level correction strength parameter control, pertaining to the first embodiment of the present invention.
Figure 3C:
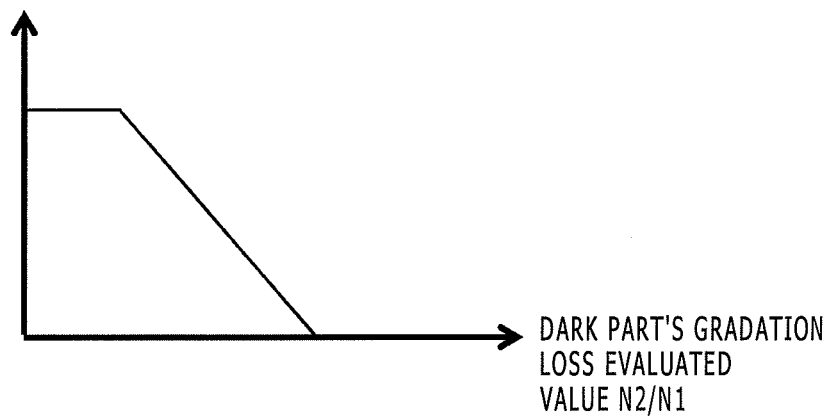
Figure 3D:
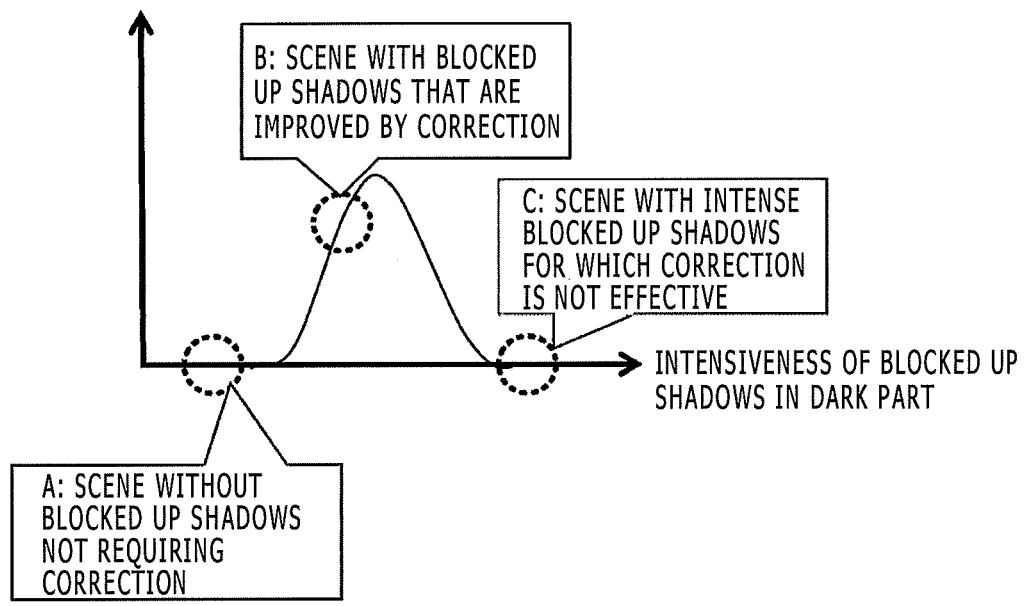

FIGS. 3A to 3G are diagrams representing examples of signal level correction strength parameter control processing pertaining to the first embodiment of the present invention. In the present invention, signal level correction strength parameter control processing is executed by the image signal correction control unit 105. FIG. 3A is a diagram representing examples of gradation decrease evaluated values which are output by the gradation decrease evaluation unit 103 and examples of gradation loss evaluated values which are output by the gradation loss evaluation unit 104. FIG. 3B is a diagram representing an example of signal level correction strength parameter control processing based on a gradation decrease evaluated value. FIG. 3C is a diagram representing an example of signal level correction strength parameter control processing based on a gradation loss evaluated value. FIG. 3D is a diagram representing an example of a characteristic of final signal level correction strength parameter control. FIG. 3E is a first diagram representing an example of a result of final signal level correction strength parameter control. FIG. 3F is a second diagram representing an example of a result of final signal level correction strength parameter control. FIG. 3G is a third diagram representing an example of a result of final signal level correction strength parameter control. In FIG. 3E, reference numeral 301_1 denotes an image in scene A before signal level correction processing and reference numeral 301_2 denotes an image in scene A after signal level correction processing. In FIG. 3F, reference numeral 302_1 denotes an image in scene B before signal level correction processing and reference numeral 302_2 denotes an image in scene B after signal level correction processing. In FIG. 3G, reference numeral 303_1 denotes an image in scene C before signal level correction processing and reference numeral 303_2 denotes an image in scene C after signal level correction processing.

As is represented in FIG. 3A, the gradation decrease evaluation unit 103 and the gradation loss evaluation unit 104 calculate gradation decrease evaluated values and gradation loss evaluated values from histogram data of image signals which have been input from the image signal input unit 101. The gradation decrease evaluation unit 103 calculates the number of pixels N1 whose luminance is smaller than a predefined threshold th_d1 as a dark part's gradation decrease evaluated value. The threshold th_d1 is set beforehand to, e.g., an upper limit of a luminance range in which a large correction effect is produced by signal level correction processing with an input-output characteristic for a dark part. Accordingly, a larger N1 value is obtained, the more objects exist that are estimated to have decreased gradation, affected by blocked up shadows. Likewise, the gradation decrease evaluation unit 103 calculates the number of pixels M1 whose luminance is larger than a predefined threshold th_l1 which has been set to a lower limit of a luminance range in which a large correction effect is produced with an input-output characteristic for a bright part as a bright part's gradation decrease evaluated value. Accordingly, a larger M1 value is obtained as more objects exist that are estimated to have decreased gradation, affected by blown out highlights. Additionally, by dividing by N1 the number of pixels N2 whose luminance is smaller than a predefined threshold th_d2 which has been set to a lower luminance value than the threshold th_d1, the gradation loss evaluation unit 104 calculates a ratio N2/N1 as a dark part's gradation loss evaluated value. The threshold th_d2 is set beforehand, e.g., on the basis of a noise level near black in image signals which are input. Accordingly, N2/N1 approximates to 1 and becomes larger as object's gradation is lost more completely since noise only exists in an image when blocked up shadows become very intense and the loss of gradation of an object occurs. Likewise, by dividing by M1 the number of pixels M2 whose luminance is larger than a predefined threshold th_l2 which has been set on the basis of a noise level near white, the gradation loss evaluation unit 104 calculates a ration M2/M1 as a bright part's gradation loss evaluated value. Accordingly, M2/M1 approximates to 1 and becomes larger, as blown out highlights become very intense and object's gradation is lost more completely. While the above ratio N2/N1 is used in the present embodiment for evaluating a degree of gradation loss for a dark part by bias of the dark part in signal distribution, it is not necessary to follow this. For example, for pixels whose luminance is smaller than th_d1, a calculation may be made of, inter aria, dispersion and standard deviation of their luminance values or a total sum of values of differences between adjacent pixels, namely, edge quantities, as a characteristic quantity. If the calculated characteristic quantity is lower, gradation loss may be judged to be larger and a larger gradation loss evaluated value may be output. A suitable characteristic quantity may be selected, taking account of the amount of calculation and the effectiveness of results of evaluation.

As is represented in FIG. 3B, the image signal correction control unit 105 determines a first correction strength coefficient S_d1 so that the correction strength parameter for a dark part will become larger as the dark part's gradation decrease evaluated value N1 becomes larger. Accordingly, the correction strength parameter becomes small in a scene where there is sufficient gradation of an object without blocked up shadows and it can be prevented that an image becomes rather constrained by performing unnecessary correction. Further, as is represented in FIG. 3C, the image signal correction control unit 105 determines a second correction strength coefficient S_d2 so that the correction strength parameter for a dark part will become smaller as the dark part's gradation loss evaluated value N2/N1 becomes larger. Accordingly, the correction strength parameter becomes small in a scene where blocked up shadows are intense and object's gradation is considered to be lost completely and it is possible to prevent a negative effect that noise is only enhanced while no correction effect is produced.

As is represented in FIG. 3D, a final signal level correction strength parameter control characteristic is obtained by multiplication of the first correction strength coefficient S_d1 and the second correction strength coefficient S_d2. Accordingly, the correction is weakened for both a scene without blocked up shadows, not requiring correction, and a scene with intense blocked up shadows for which correction is not effective, and it can be prevented that a negative effect is produced by correction. For example, scene A presented in FIG. 3E represents a scene during daylight or the like, where there are no blocked up shadows and correction is not required. Thus, in an image as denoted by 301_1, a dark part has sufficient gradation at a stage prior to correction. In this case, because the gradation decrease evaluated value N1 becomes small, the first correction strength coefficient S_d1 is also small and the final correction strength parameter is small. Thus, the correction strength is weakened in an image as denoted by 301_2 and it can be prevented that negative effects, i.e., blown out highlights appearing in the image and enhanced noise, are produced by executing the correction despite the fact that there is no object affected by blocked up shadows.

Scene B presented in FIG. 3F represents a scene where blocked up shadows occur due to underexposure in a backlight condition, illuminated by the headlights of an oncoming car. Thus, in an image as denoted by 302_1, the lack of gradation in a dark part degrades visibility at a stage prior to correction. In this case, because the gradation decrease evaluated value N1 is large and the gradation loss evaluated value N2/N1 is small, both the first correction strength coefficient S_d1 and the second correction strength coefficient S_d2 become large and the final correction strength parameter is also large. Thus, in an image as denoted by 302_2, signal level correction for the dark part is strengthened to properly correct the object affected by blocked up shadows and a visibility improving effect is obtained.

Scene C presented in FIG. 3G represents a scene where a very high illumination of the headlights of an oncoming car makes underexposure worse than in scene B and blocked up shadows have become very intense. Thus, in an image as denoted by 303_1, gradation in a dark part is lost completely and noise components only exist in signals at a stage prior to correction. In this case, because the gradation loss evaluated value N2/N1 becomes large, the second correction strength coefficient S_d2 is small and the final correction strength parameter is small. Thus, in an image as denoted by 303_2, the correction is weakened and it is possible to prevent a negative effect in which noise is only enhanced without improvement in the visibility of the object.

While the foregoing description with FIGS. 3B to 3D has focused on controlling the correction strength parameter when signal level correction processing is applied to a dark part, similar processing using the bright part's gradation decrease evaluated value M1 and gradation loss evaluated value M2/M1 is also performed for controlling the correction strength parameter when signal level correction processing is applied to a bright part. Control can be implemented to vary the correction strength depending on whether or not an object is affected by blown out highlights and the intensiveness of blown out highlights, independently of a condition of blocked up shadows. For example, in scene B presented in FIG. 3F and scene C presented in FIG. 3G, there are differing degrees of blocked up shadows in the dark part, whereas blown out highlights in a bright part are comparable in degree. Thus, signal level correction processing with a same level of correction strength is executed for the bright part separately from whether or not signal level correction is executed for the dark part. In this way, it is possible to control the correction strength using an evaluated value suitable for the brightness of each object.

When executing correction strength parameter control processing for the foregoing signal level correction processing, it is possible to calculate a gradation decrease evaluated value and a gradation loss evaluated value using common histogram data and implementation at low cost is feasible. Because information of image signals which have been input is only used, an additional advantage is that a result of correction does not influence each evaluated value and stable control can be implemented.

According to the present embodiment as above, by controlling the correction strength depending on whether or not correction is required due to blocked up shadows and blown out highlights among others and whether or not correction is effective, an automatic selection is made of the visibility improving effect for a scene where a large correction effect is produced and control with priority given to image quality for other scenes and an optimum effect that is adaptive to scenes can be implemented at low cost. The image signal processing apparatus 1 of the present embodiment can take input of image signals captured by various kinds of cameras for consumer use and industrial use including in-vehicle cameras connected to a drive recorder, in-vehicle monitor, etc. and security cameras which are installed in a particular facility and along streets, among others, and can perform correction processing on the image signals. In this case, the image signal processing apparatus 1 of the present embodiment may be embedded in various kinds of cameras or may be configured as a separate image processing device product. Further, the functions of the image signal processing apparatus 1 of the present embodiment may be configured as an application program that is implemented on a computer, so that correction processing on image data taken in the computer such as a personal computer can be executed by the computer.

Second Embodiment

Next, a second embodiment of the present invention is described. The present embodiment is an example where the present invention is applied to foggy image correction processing. A configuration of the present embodiment is the same as depicted in the first schematic diagram (FIG. 1) which depicts the image signal processing apparatus 1 pertaining to the first embodiment of the present invention. A different effect is produced by signal level correction processing in the image signal correction unit 102 and correction strength parameter control processing for signal level correction processing in the image signal correction control unit 105.

Figure 4:
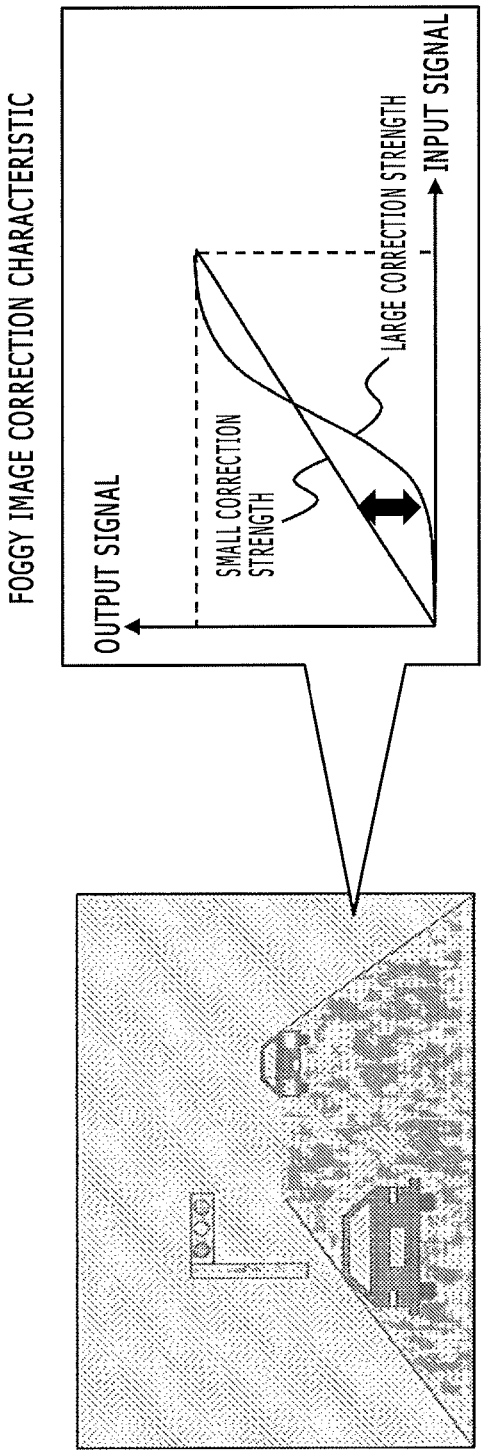
FIG. 4 is a diagram representing an example of signal level correction processing pertaining to a second embodiment of the present invention.

FIG. 4 is a diagram representing an example of signal level correction processing pertaining to the second embodiment of the present invention. In the present embodiment, signal level correction processing is executed by the image signal correction unit 102. FIG. 4 is an example of correction processing in a case where object's gradation decreased due to fog coming about.

In the example of signal level correction processing represented in FIG. 4, the image signal correction unit 102 is configured to preliminarily hold input-output characteristics to provide correction characteristics of expanding signals in an intermediate luminance part. As is well known, object's gradation, when affected by fog, converges to approximate to a given level of luminance, but how signals converge differs depending on fog conditions and exposure conditions. Now, determining what range of luminance to expand in an intermediate luminance part can be made by detecting the maximum and minimum values of luminance in a local area including pixels of interest. A plurality of input-output characteristics are prepared beforehand in lookup tables or function expressions. With respect to the maximum and minimum values of luminance in a local area including pixels of interest, a selection is made of an input-output characteristic to make the maximum value of luminance larger and the minimum value of luminance smaller. By making such selection for each area, it would become possible to perform gradation expansion processing depending on the density of fog for each area. Further, correction is made of the input-output characteristic calculated for each local area depending on the correction strength parameter. If the correction strength parameter is small, it is possible to weaken the correction by approximation to an input-output characteristic in which input and output match. In this way, adaptive gradation correction depending on the density of fog for each area makes it possible to improve the visibility in a foggy scene. By giving the correction strength parameter as an input, it would become possible to control whether or not correction should be applied and whether to strengthen or weaken correction as necessary.

Figure 5A:
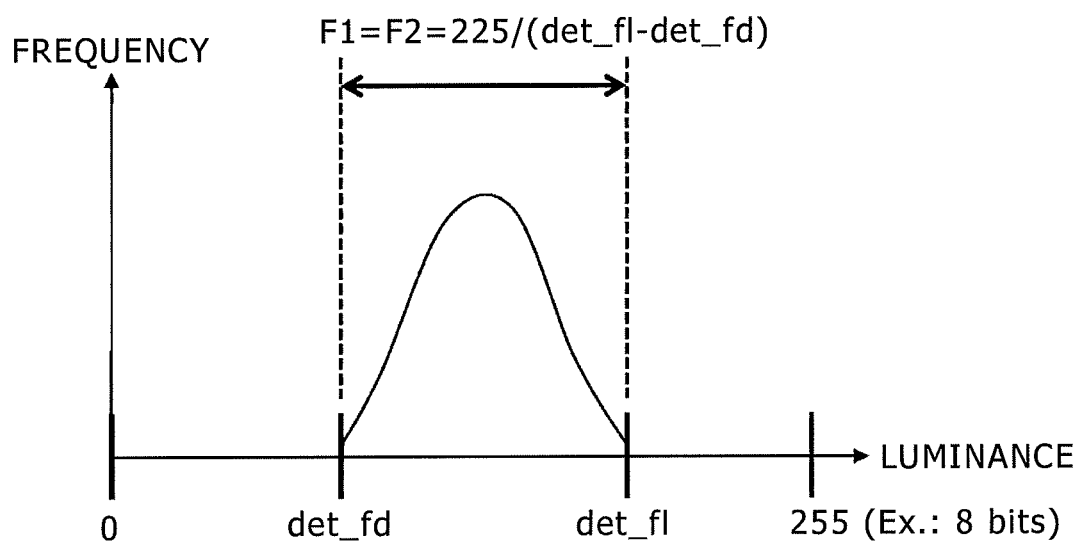
FIG. 5A is a first diagram representing an example of a gradation decrease evaluated value which is output by the gradation decrease evaluation unit 103 and an example of a gradation loss evaluated value which is output by the gradation loss evaluation unit 104, pertaining to the second embodiment of the present invention.
Figure 5B:
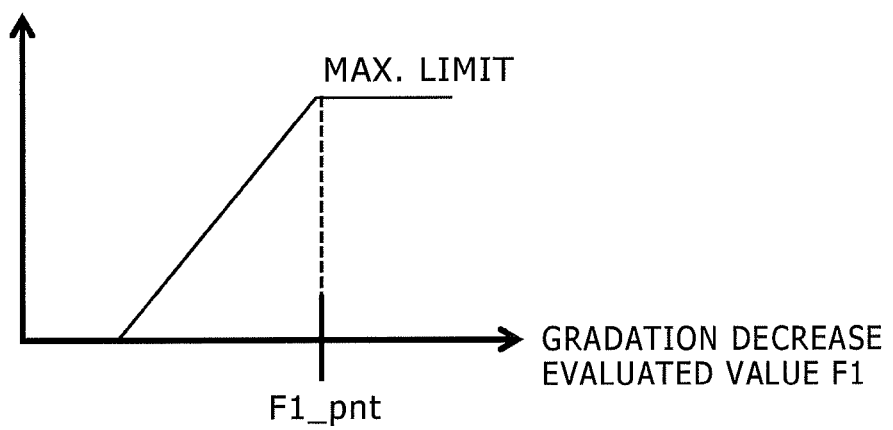
FIG. 5B is a diagram representing an example of signal level correction strength parameter control processing based on a gradation decrease evaluated value, pertaining to the second embodiment of the present invention.
Figure 5C:
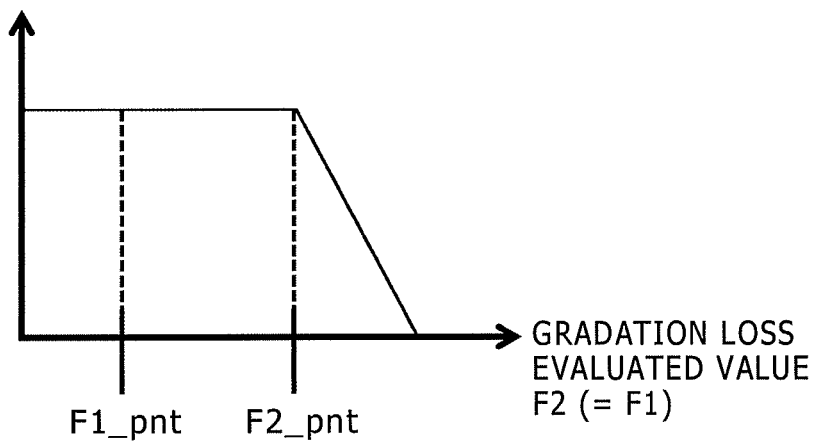
FIG. 5C is a diagram representing an example of signal level correction strength parameter control processing based on a gradation loss evaluated value, pertaining to the second embodiment of the present invention.
Figure 5D:
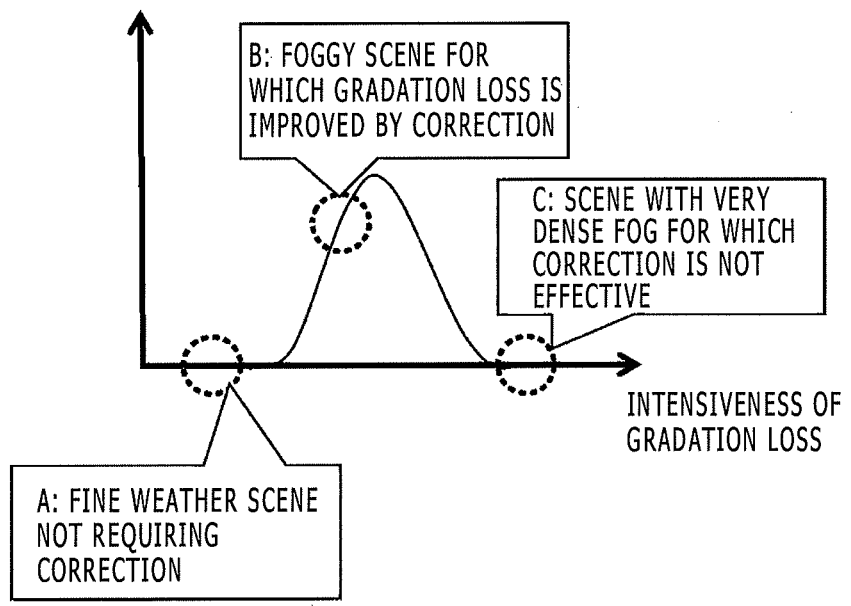
FIG. 5D is a diagram representing an example of a characteristic of final signal level correction strength parameter control, pertaining to the second embodiment of the present invention.
Figure 5E:
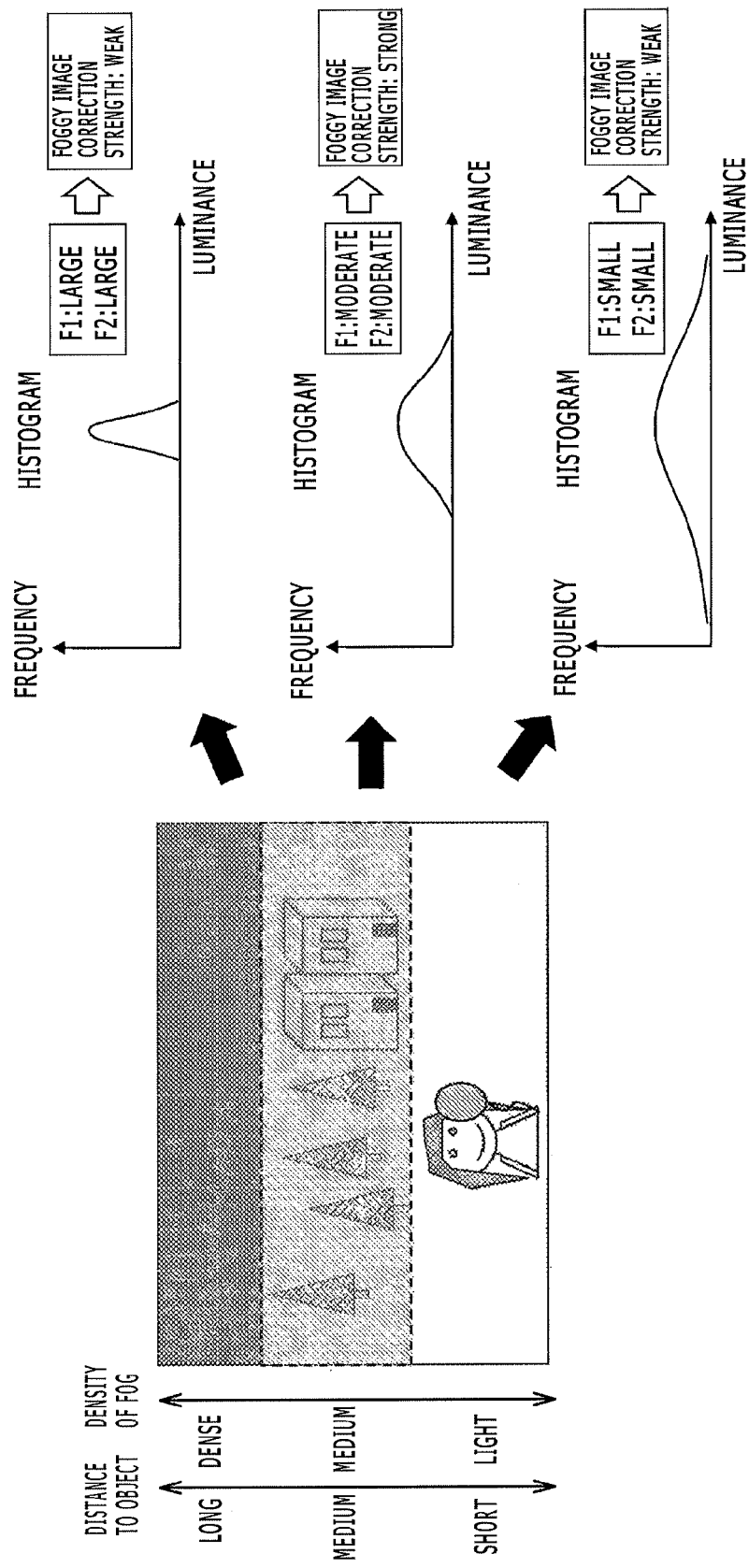
FIG. 5E is a first diagram representing an example of signal level correction strength parameter control in a foggy scene, pertaining to the second embodiment of the present invention.
Figure 5F:
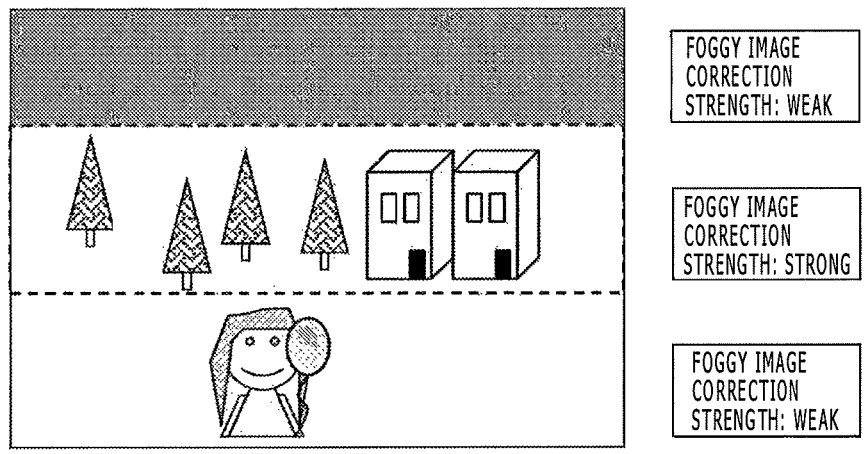
FIG. 5F is a diagram representing an example of a result of signal level correction strength parameter control in a foggy scene, pertaining to the second embodiment of the present invention.

FIGS. 5A to 5F are first diagrams representing examples of signal level correction strength parameter control processing pertaining to the second embodiment of the present invention. In the present embodiment, signal level correction strength parameter control processing is executed by the image signal correction control unit 105. FIG. 5A is a first diagram representing an example of a gradation decrease evaluated value which is output by the gradation decrease evaluation unit 103 and an example of a gradation loss evaluated value which is output by the gradation loss evaluation unit 104. FIG. 5B is a diagram representing an example of signal level correction strength parameter control processing based on a gradation decrease evaluated value. FIG. 5C is a diagram representing an example of signal level correction strength parameter control processing based on a gradation loss evaluated value. FIG. 5D is a diagram representing an example of a characteristic of final signal level correction strength parameter control. FIG. 5E is a first diagram representing an example of signal level correction strength parameter control in a foggy scene. FIG. 5F is a diagram representing an example of a result of signal level correction strength parameter control in a foggy scene.

As is represented in FIG. 5A, the gradation decrease evaluation unit 103 and the gradation loss evaluation unit 104 calculate a gradation decrease evaluated value and a gradation loss evaluated value from histogram data of image signals which have been input from the image signal input unit 101. The gradation decrease evaluation unit 103 detects a luminance range of an object according to a difference between the maximum value det_fl and the minimum value det_fd of luminance signals of the object from the histogram data and calculates a proportion of the luminance range to a signal range, i.e., a reciprocal of a reduction ratio of contrast as a gradation decrease evaluated value F1. Accordingly, a larger F1 value is obtained in proportion to a decrease in the gradation affected by fog. Additionally, in the present embodiment, the gradation loss evaluation unit 104 calculates a characteristic quantity like F1 as a gradation loss evaluated value F2.

As is represented in FIG. 5B, the image signal correction control unit 105 determines a first correction strength coefficient S_f1 so that the correction strength parameter for a dark part will become larger as the dark part's gradation decrease evaluated value F1 becomes larger. As is represented in FIG. 5C, the image signal correction control unit 105 determines a second correction strength coefficient S_f2 so that the correction strength parameter for a dark part will become smaller as the dark part's gradation loss evaluated value F2 becomes larger. In this regard, a gradation decrease evaluated value F1_pnt when S_f1 has reached a maximum limit corresponds to a maximum expansion ratio in expanding gradation by foggy image correction. Now, given that a maximum expansion ratio of gradation is set to, e.g., a factor of 10 in a noise enhancement permissible range, F1_pnt should be set to 10. Further, a gradation loss evaluated value F2_pnt when S_f2 begins to decrease should be determined on the basis of a noise level in an intermediate luminance part, taking account of the fact that noise is only distributed on a histogram when gradation has been lost completely. In this regard, however, the gradation loss evaluated value F2_pnt when S_f2 begins to decrease should be set larger than the gradation decrease evaluated value F1_pnt when S_f1 has reached the maximum limit; F2_pnt>F1_pnt.

As is represented in FIG. 5D, a final signal level correction strength parameter control characteristic is to be obtained by multiplication of the first correction strength coefficient S_f1 and the second correction strength coefficient S_f2. In a light fog situation, when the gradation decrease evaluated value F1 and the gradation loss evaluated value F2 are sufficiently small than F1_pnt, that is, both F1 and F2 are small, then, S_f1 is small and thus the final correction strength parameter becomes small. On the other hand, in a dense fog situation, the final correction strength parameter gradually increases as F1 and F2 become larger, and F1 and F2 fall between F1_pnt and F2_pnt. That is, when both F1 and F2 are moderate, both S_f1 and S_f2 become maximal and thus the final correction strength parameter also becomes maximal. In a situation where fog becomes denser, F1 and F2 become larger values and S_f2 decreases and, accordingly, the final correction strength parameter gradually decreases. Thereby, it is possible to prevent a negative effect from being produced by correction in both a scene without fog, not requiring correction, and a scene with a very dense fog for which correction is not effective. By controlling the correction strength in this way for each area of a screen, it would become possible to implement control taking account of the fact that fog differently affects different areas of the screen.

For example, FIG. 5E illustrates a scene where objects exist at different distances from a camera, in which an image in a screen's lower part in which distance from the camera to an object is short is affected to a small degree by fog and an image in a screen's upper part in which distance from the camera to an object is long is affected to a large degree by fog. The screen's lower part where fog is light is an area not requiring correction, because gradation is obtained sufficiently there. In this case, the gradation decrease evaluated value F1 and the gradation loss evaluated value F2 are sufficiently smaller than F1_pnt and thus S_f1 becomes small and the final correction strength parameter becomes small. The screen's middle part where an image is foggy is an area where the lack of gradation degrades visibility. In this case, F1 and F2 fall between F1_pnt and F2_pnt, that is, both F1 and F2 are moderate, and the gradation decrease evaluated value F1 becomes larger than F1_pnt and S_f1 becomes large, whereas the gradation loss evaluated value F2 is smaller than F2_pnt and thus S_f2 also becomes large, and the final correction strength parameter also becomes large. The screen's upper part where fog is very dense is an area where gradation is lost completely and noise components only exist in signals. In this case, the gradation decrease evaluated value F1 and the gradation loss evaluated value F2 are sufficiently larger than F2_pnt and thus S_f2 becomes smaller and the final correction strength parameter becomes small. Accordingly, as is represented in FIG. 5F, the correction effect is weakened in the screen's lower part which is affected to a small degree by fog and it is possible to prevent a negative effect in which blown out highlights in a bright part and blocked up shadows in a dark part occur due to excessively expanding signals in an intermediate luminance part. The correction effect is strengthened in the screen's middle part where an image is foggy and the visibility improving effect is obtained by expanding signals in an intermediate luminance part. The correction effect is weakened in the screen's upper part where fog is very dense and it is possible to prevent a negative effect in which noise is only enhanced without improvement in the visibility of the object. In this way, it would become possible to control correction strength to be optimum for each area depending on whether or not correction is required by presence or absence of fog and a degree of correction effect depending on the density of fog.

Figure 6A:
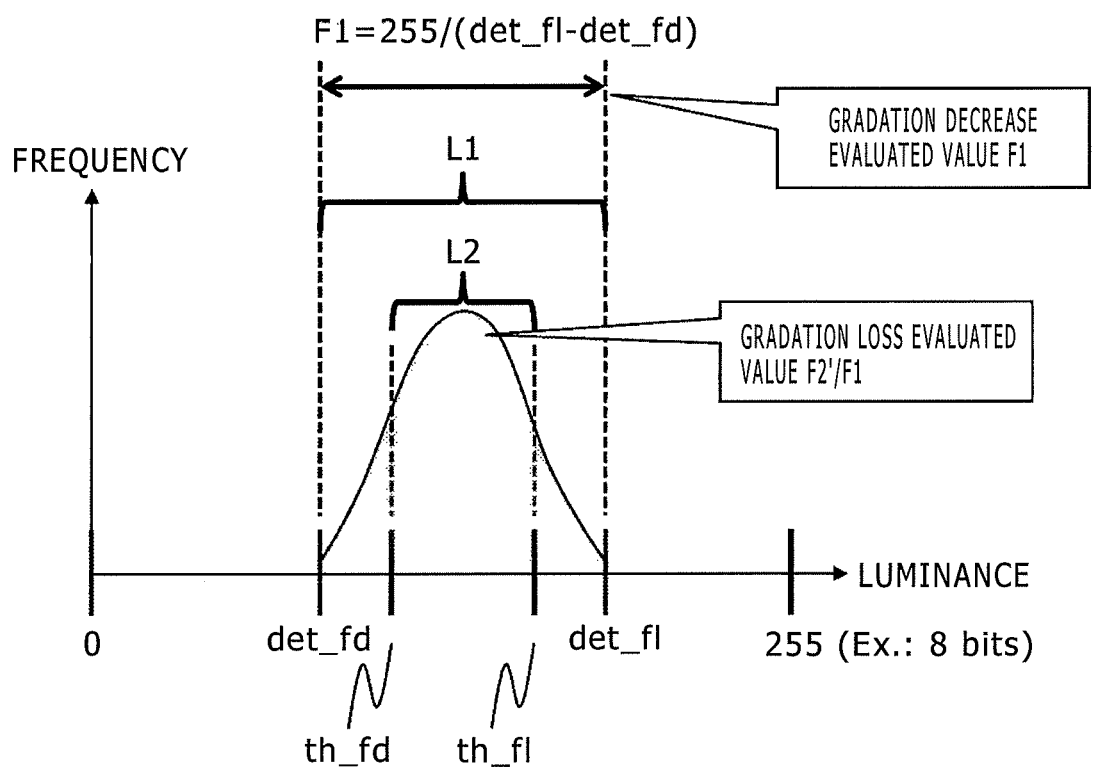
FIG. 6A is a second diagram representing an example of a gradation decrease evaluated value which is output by the gradation decrease evaluation unit 103 and an example of a gradation loss evaluated value which is output by the gradation loss evaluation unit 104, pertaining to the second embodiment of the present invention.
Figure 6B:
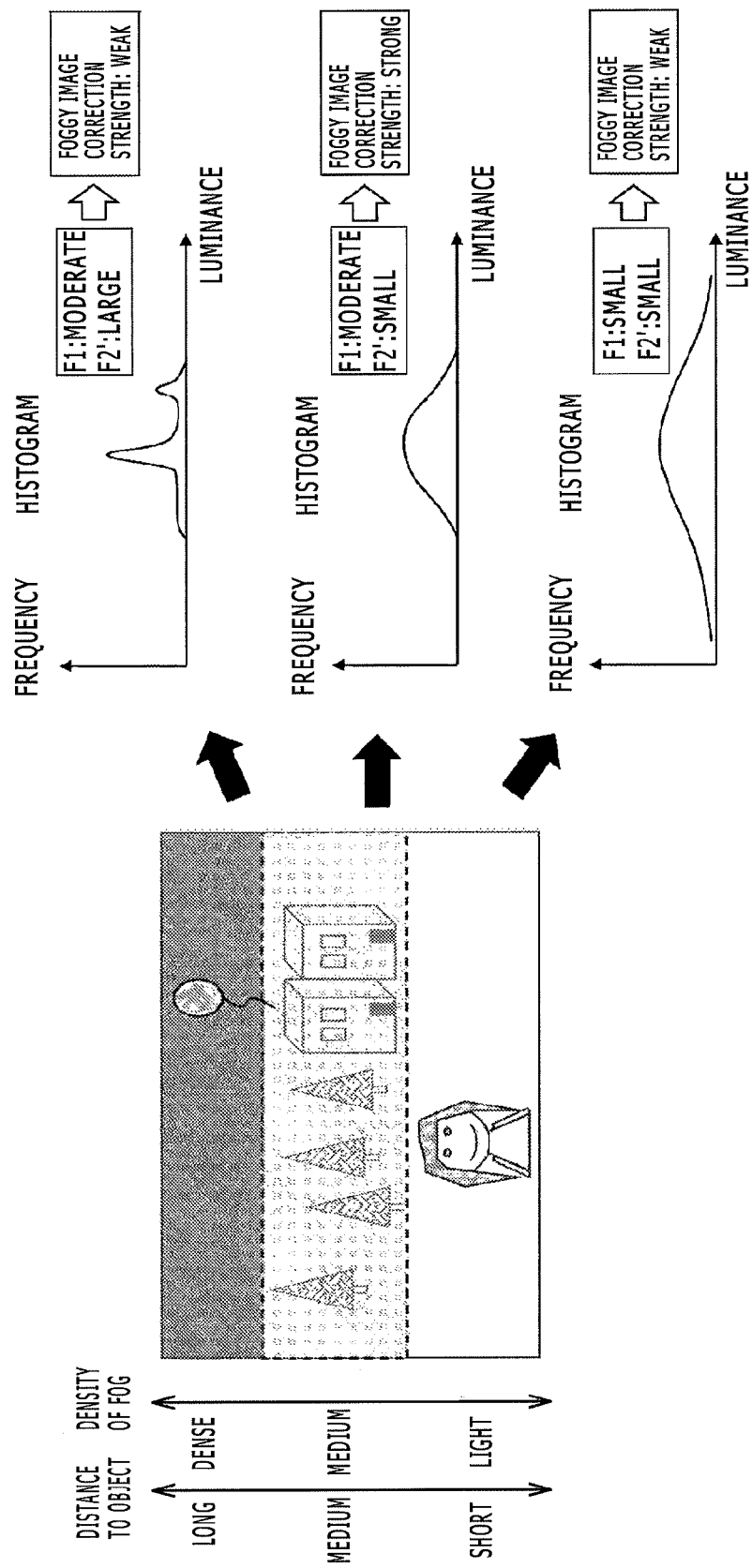
FIG. 6B is a second diagram representing an example of signal level correction strength parameter control in a foggy scene, pertaining to the second embodiment of the present invention.

Next, an example of modification to the second embodiment is described. FIGS. 6A and 6B are diagrams representing an example of signal level correction strength parameter control processing pertaining to the present modification example. FIG. 6A is a second diagram representing an example of a gradation decrease evaluated value which is output by the gradation decrease evaluation unit 103 and an example of a gradation loss evaluated value which is output by the gradation loss evaluation unit 104. FIG. 6B is a second diagram representing an example of signal level correction strength parameter control in a foggy scene.

In the example represented in FIG. 6A, instead of F2 as a gradation loss evaluated value, a ratio L2/L1, i.e., to the number of pixels L1 existing in a luminance range of an object between det_fl and det_fd, the ratio of the number of pixels L2 existing in a predefined luminance range between th_fl and th_fd which are set between det_fl and det_fd, is calculated as a gradation loss evaluated value F2'. det_fl and det_fd are set beforehand on the basis of a noise level near an intermediate luminance part of image signals which are input. For example, det_fl and det_fd may be obtained by adding and subtracting an image's noise level measured beforehand to and from the center of a histogram, that is, an average value of luminance. Accordingly, F2' approximates to 1 and becomes larger, as object's gradation is lost more completely, since noise only exists in an image when object's gradation is lost in a very dense fog situation. Considering that noise in an image is normally distributed, for example, if F2' is larger than on the order of 0.7, it is conceivable that object's gradation is lost completely and, probably, noise components only exist. The use of F2' as a gradation loss evaluated value has such an advantage as noted below. As is represented in FIG. 6B, in a case where the image of an small object whose distance from the camera is short and which is affected to a small decree by fog appeared as disturbance locally in the screen's upper part, namely, the area in which distance from the camera to an object is long and which is affected to a large degree by fog, and even if an object's luminance range between det_fl and det_fd, widened under the influence of the disturbance, is detected, it is possible to properly estimate a degree of gradation loss and weaken correction strength. The above F2'/F1 is used in the present embodiment for evaluating a degree of gradation loss is evaluated by bias of the dark part in signal distribution. However', for example, for pixels existing between det_fl and det_fd, a calculation may be made of, inter alia, dispersion and standard deviation of their luminance values or a total sum of values of differences between adjacent pixels, namely, edge quantities, as a characteristic quantity. If the calculated characteristic quantity is lower, gradation loss may be judged to be larger and a larger gradation loss evaluated value may be output. A suitable characteristic quantity may be selected, taking account of the amount of calculation and the effectiveness of results of evaluation.

According to the present embodiment as above, by controlling the correction strength depending on whether or not correction is required due to fog density and how much correction is effective, an automatic selection is made of the visibility improving effect for a scene where a large correction effect is produced and control with priority given to image quality for other scenes, and an optimum effect that is adaptive to scenes can be implemented at low cost. The image signal processing apparatus 1 of the second embodiment can also be used in various forms, as is the case for the first embodiment.

Third Embodiment

Figure 7:
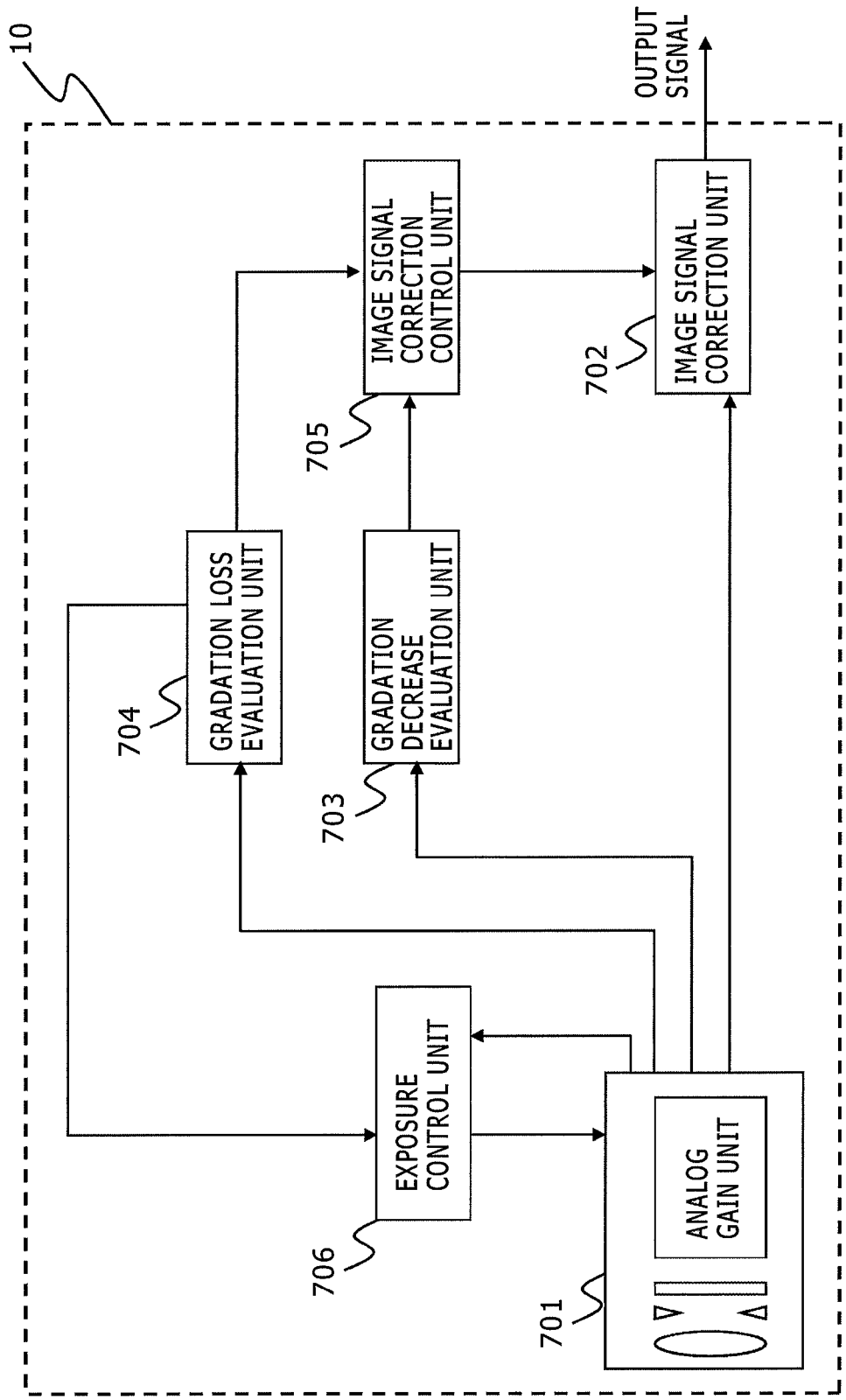
FIG. 7 is a schematic diagram depicting a configuration example of an image capturing apparatus pertaining to a third embodiment of the present invention.

Next, a third embodiment of the present invention is described. FIG. 7 is a schematic diagram depicting a configuration example of an image capturing apparatus 10 pertaining to the third embodiment of the present invention. The image capturing apparatus 10 in FIG. 7 includes an image capturing unit 701, an image signal correction unit 702, a gradation decrease evaluation unit 703, a gradation loss evaluation unit 704, an image signal correction control unit 705, and an exposure control unit 706. According to the schematic diagram depicting the image capturing apparatus 10 pertaining to the third embodiment of the present invention, depicted in FIG. 7, the configuration of the image processing apparatus 1 pertaining to the first embodiment of the present invention, depicted in FIG. 1, is applied and embedded in the image capturing apparatus. The image signal correction unit 702, gradation decrease evaluation unit 703, gradation loss evaluation unit 704, and image signal correction control unit 705 operate in the same way as in the first embodiment. Although the hardware elements in FIG. 1 are omitted from depiction in FIG. 7, the respective processing units of the image capturing apparatus 10 can be implemented by combining hardware and software appropriately, as is the case for the image processing apparatus 1 of the first embodiment.

In the image capturing apparatus 10 depicted in FIG. 7, the image capturing unit 701 is configured by appropriately using a set of lenses including a zoom lens and a focus lens, an iris (diaphragm), a shutter, an image pickup device such as CCD (Charge Coupled Device) or CMOS. (Complementary Metal-Oxide Semiconductor), CdS (Cadmium Sulfide), AGC (Automatic Gain Control), AD converter, etc. and makes photoelectric conversion of an optical image received by the image pickup device and outputs an image signal. When doing so, the apparatus may perform a variety of camera imaging operations such as detecting an exposure amount evaluated value, digital gain processing, calculating a local brightness across pixels, and noise correction processing and generate an image signal to be output.

Figure 8:
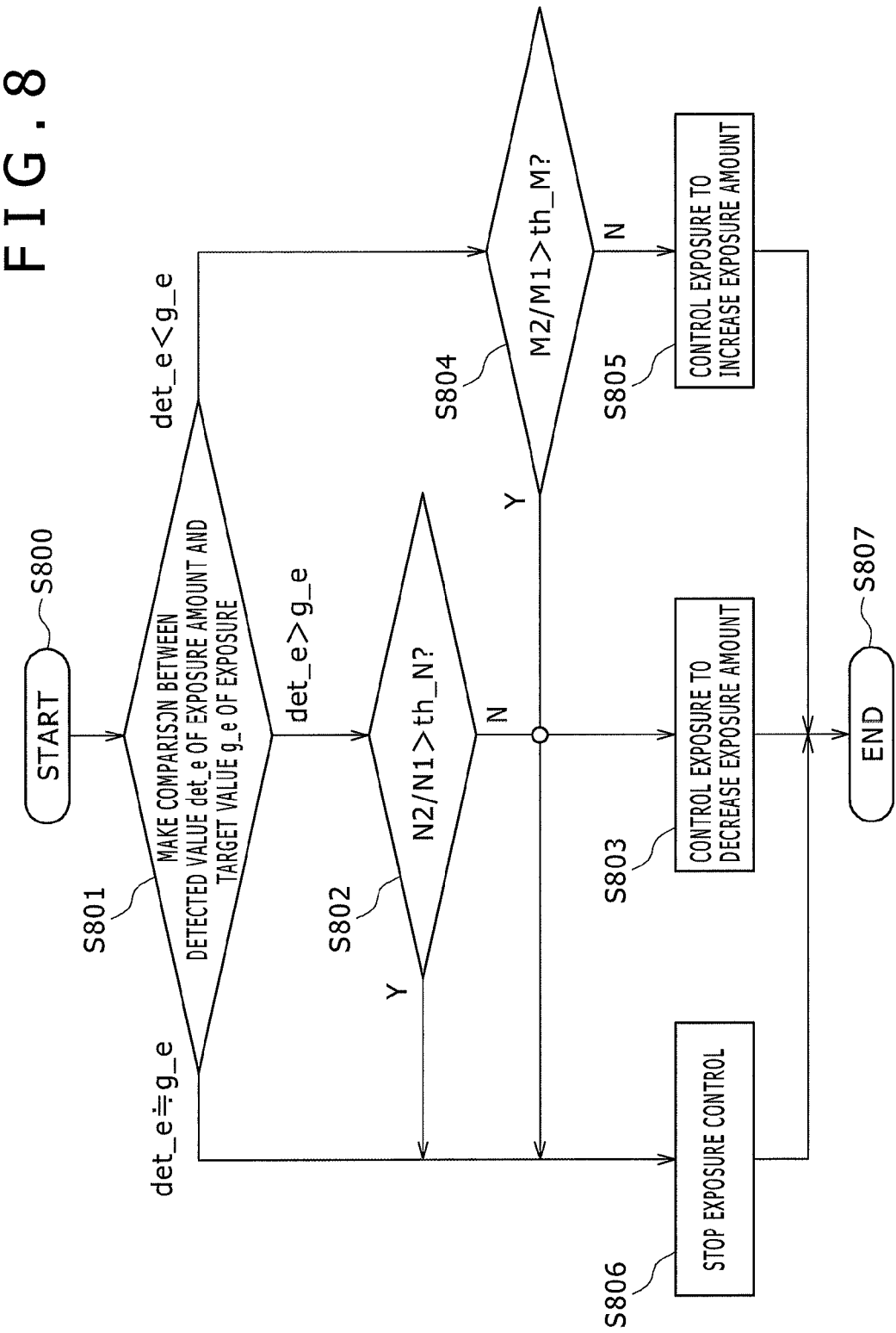
FIG. 8 is a diagram illustrating an example of processing sequence regarding exposure control in the image capturing apparatus pertaining to the third embodiment of the present invention.

The exposure control unit 706 obtains an exposure amount evaluated value of image signals which have been output by the image capturing unit 701 and adjusts exposure appropriately for a scene to be photographed by controlling the iris diaphragm, shutter timing, analog gain amount of AGC, digital gain amount, etc. in the image capturing unit 701 so that an actual exposure amount approximates to a predefined target exposure amount. Additionally, the exposure control unit 706 obtains a gradation loss evaluated value from the gradation loss evaluation unit 704. If a decision is that exposure control, as a result, has made gradation loss larger, the exposure control unit 706 is controlled to stop exposure control even though an actual exposure amount has not reached the predefined target exposure amount. Accordingly, for example, in a backlight situation where there is a very large difference in brightness between backlight and other lights, when the exposure amount is decreased to be suitable for backlight, it would become possible to prevent that blocked up shadows occur due to underexposure:

FIG. 8 is a diagram illustrating an example of processing sequence regarding exposure control in the image capturing apparatus 10 pertaining to the third embodiment of the present invention. The exposure control sequence which is illustrated in FIG. 8 is executed by the exposure control unit 706 depicted in FIG. 7.

The processing sequence regarding exposure control illustrated in FIG. 8 starts, triggered by, typically, power on of the image capturing apparatus 10 (S800). At S801, a comparison is made between a detected value det_e of exposure amount and a target value g_e of exposure. In this regard, considering that there is a variation in detected values det_e of exposure amount under the influence of noise or the like, hysteresis values α, β may be attached to the target value g_e of exposure and g_e+α and g_e−β each may be compared with det_e to decide which is larger. In consequence, if a decision is that the detected value det_e of exposure amount is significantly larger than the target value g_e of exposure, the process goes to step S802; if a decision is that the detected value det_e of exposure amount is significantly smaller than the target value g_e of exposure, the process goes to step S804; and if a decision is that both are approximately equal, the process goes to step S806.

At S802, a dark part's gradation loss evaluated value N2/N1 is compared with a predefined threshold th_N and it is decided whether object's gradation in a dark part is lost. If N2/N1 is less than th_N, the process goes to step S803; if N2/N1 is more than th_N, the process goes to step S806. At S803, a decision is made that the current exposure amount is larger than the target value, which indicates a brighter condition than proper exposure and a condition free of blocked up shadows, and exposure control is exerted to decrease the exposure amount. At S804, a bright part's gradation loss evaluated value M2/M1 is compared with a predefined threshold th_M and it is decided whether object's gradation in a bright part is lost. If M2/M1 is less than th_M, the process goes to step S805; if M2/M1 is more than th_M, the process goes to step S806.

At S805, a decision is made that the current exposure amount is smaller than the target value, which indicates a darker condition than proper exposure and a condition free of blown out highlights, and exposure control is exerted to increase the exposure amount. At S806, a decision is made that proper exposure has already been reached or further exposure control will make blocked up shadows or blown out highlights intense, and exposure control is stopped. Accordingly, by exposure control, it is possible to prevent exposure from resulting in blocked up shadows or blown out highlights in advance of their occurrence. If blocked up shadows or blown out highlights still occur even after this control, proper correction depending on a degree of the blocked up shadows or blown out highlights can be executed through processing in which the image signal correction control unit 705 controls correction strength of signal level correction by the image signal correction unit 702.

According to the present embodiment as above, after the influence of blocked up shadows or blown out highlights is diminished in advance by exposure control, by controlling the correction strength depending on whether or not correction is required due to blocked up shadows and blown out highlights among others and how much correction is effective, an automatic selection is made of the visibility improving effect for a scene where a large correction effect is produced and control with priority given to image quality for other scenes, and an optimum effect that is more adaptive to scenes can be implemented at low cost. The configuration of the image capturing apparatus 10 of the present embodiment can be applied to a variety of types of image capturing equipment, e.g., security cameras which are installed in diverse facilities, along streets, among others, in-vehicle cameras, etc.

The present invention is not limited to the embodiments described hereinbefore and various modifications are included therein. For example, the foregoing embodiments are those that have been described in detail to explain the present invention clearly and the invention is not necessarily limited to those including all components described. A part of the configuration of an embodiment can be replaced by the configuration of another embodiment. The configuration of another embodiment can be added to the configuration of an embodiment.

What is claimed is:

1. An image signal processing apparatus comprising:
   an image signal input device to which image signals are input;
   a gradation decrease evaluation device that calculates a gradation decrease evaluated value for evaluating a degree of gradation decrease with respect to an object which is included in the image signals from the image signal input unit;
   a gradation loss evaluation device that calculates a gradation loss evaluated value for evaluating a degree of gradation loss with respect to an object which is included in the image signals;
   an image signal correction device that performs signal level correction processing on the input image signals and outputs image signals whose signal levels have been corrected; and
   an image signal correction control device that controls correction strength of image signal correction processing that is executed by the image signal correction unit, using both the gradation decrease evaluated value which is output by the gradation decrease evaluation device and the gradation loss evaluated value which is output by the gradation loss evaluation unit,
   wherein the image signal correction control device performs control to decrease the correction strength, if having determined that the gradation decrease evaluated value is small, and to decrease the correction strength, if having determined that the gradation loss evaluated value is large.

2. The image signal processing apparatus according to claim 1,
   wherein the gradation decrease evaluation device makes the gradation decrease evaluated value larger, if having determined that a great number of pixels are included within a predefined luminance range in the image signals.

3. The image signal processing apparatus according to claim 2,
   wherein the gradation loss evaluation device makes the gradation loss evaluated value larger, if having determined that there is a large bias of luminance within the predefined range of luminance in the image signals.

4. The image signal processing apparatus according to claim 1,
   wherein the image signal correction device estimates brightness of an object including pixels of interest in terms of at least two or more distinct levels of tone based on brightness information extracted from the image signals and performs signal level correction processing with one of different input-output characteristics appropriate for each level;
   the gradation decrease evaluation device and the gradation loss evaluation device evaluate, respectively, a degree of gradation decrease and a degree of gradation loss of an object in luminance ranges corresponding to the distinct levels of brightness; and
   the image signal correction control device controls correction strength of the signal level correction processing for each of the distinct levels of brightness of an object, using the gradation decrease evaluated value and the gradation loss evaluated value each of in the corresponding luminance ranges.

5. The image signal processing apparatus according to claim 1,
   wherein the gradation decrease evaluation device makes the gradation decrease evaluated value larger, if having determined that there is only a small difference between maximum and minimum values of object's luminance in the image signals.

6. The image signal processing apparatus according to claim 5,
   wherein the gradation loss evaluation device makes the gradation loss evaluated value larger, if having determined that there is a large bias of luminance between maximum and minimum values of the object's luminance in the image signals.

7. The image signal processing apparatus according to claim 1,
   wherein the image signal correction device performs signal level correction processing with different input-output characteristics for different image areas which are included in the image signals;
   the gradation decrease evaluation device and the gradation loss evaluation device evaluate, respectively, a degree of gradation decrease and a degree of gradation loss in substantially the same areas for which the signal level correction processing is performed; and
   the image signal correction control device controls correction strength of the signal level correction processing for each of the image areas, using the gradation decrease evaluated value and the gradation loss evaluated value calculated for each of the corresponding image areas.

8. An image capturing apparatus comprising:
   an image capturing device that captures an image and generates and outputs image signals;
   a gradation decrease evaluation device that calculates a gradation decrease evaluated value for evaluating a degree of gradation decrease with respect to an object which is included in the image signals;
   a gradation loss evaluation device that calculates a gradation loss evaluated value for evaluating a degree of gradation loss with respect to an object which is included in the image signals;
   an image signal correction device that performs signal level correction processing on the input image signals and outputs image signals whose levels have been corrected;
   an image signal correction control device that controls correction strength of image signal correction processing that is executed by the image signal correction unit, using both the gradation decrease evaluated value which is output by the gradation decrease evaluation device and the gradation loss evaluated value which is output by the gradation loss evaluation unit; and
   an exposure control device that controls exposure of the image capturing unit, based on an exposure amount determined according to the image signals and the gradation loss evaluated value,
   wherein the image signal correction control device performs control to decrease the correction strength, if having determined that the gradation decrease evaluated value is small, and to decrease the correction strength, if having determined that the gradation loss evaluated value is large.

9. The image capturing apparatus according to claim 8,
   wherein the exposure control device prevents exposure control from further decreasing the exposure amount, if having determined that a gradation loss evaluated value for a dark part which is included in the image signals is larger than a predefined threshold.

10. The image capturing apparatus according to claim 8,
    wherein the exposure control device prevents exposure control from further increasing the exposure amount, if having determined that a gradation loss evaluated value for a bright part which is included in the image signals is larger than a predefined threshold.

11. An image signal processing method comprising:

receiving image signals;

calculating a gradation decrease evaluated value for evaluating a degree of gradation decrease with respect to an object which is included in the received image signals;

calculating a gradation loss evaluated value for evaluating a degree of gradation loss with respect to an object which is included in the image signals;

controlling correction strength of image signal correction processing that is executed on the image signals so as to decrease the correction strength, if having determined that the gradation decrease evaluated value is small, and decrease the correction strength, if having determined that the gradation loss evaluated value is large; and executing correction processing on the image signals, applying the thus controlled correction strength.

\* \* \* \* \*